Jan. 14, 1958
A. D. BALSAM
2,819,776
COMBINED SUN SHADE AND ARTICLE CARRIER
Filed Dec. 28, 1956
2 Sheets-Sheet 1
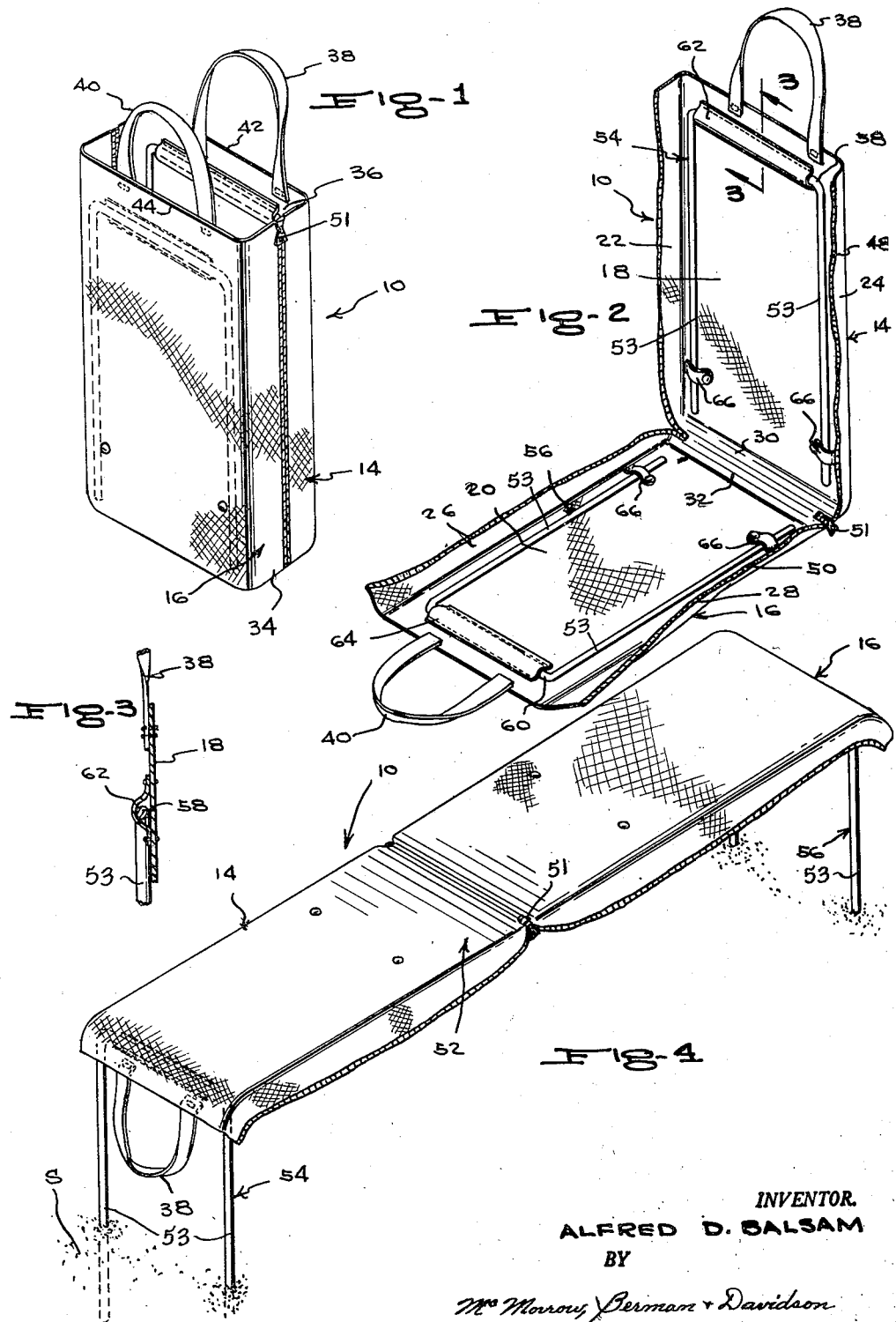
INVENTOR.
ALFRED D. BALSAM
BY
McMorrow, Berman + Davidson
ATTORNEYS

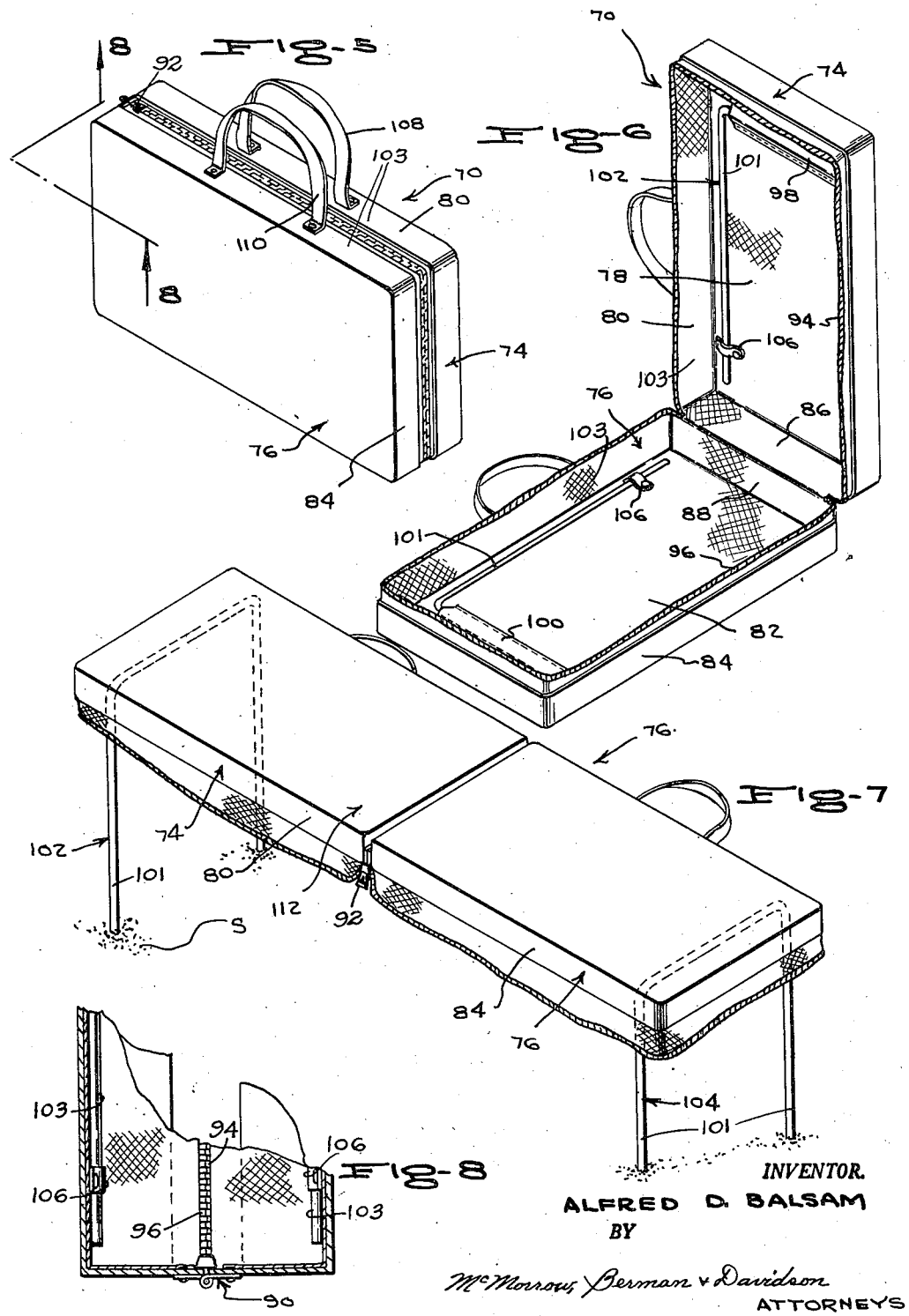

United States Patent Office 2,819,776
Patented Jan. 14, 1958

2,819,776

COMBINED SUN SHADE AND ARTICLE CARRIER

Alfred D. Balsam, Augusta, Ga.

Application December 28, 1956, Serial No. 631,234

5 Claims. (Cl. 190—42)

This invention relates generally to improved combined sun shade and article carriers for transporting such articles as beach equipment, and adjustable to serve as a sun shade.

The primary object of the invention is to provide practical and efficient devices of this kind, in the form of luggage bags or valises, which are simple in construction, composed of a small number of simple and easily assembled parts, and which have leg assemblies secured to lie flat within hinged sections of the devices without interference with clothes and the like therein.

Another object of the invention is to provide combined sun shade and article carriers of the character indicated which can be made in attractive, rugged, and serviceable forms at relatively low cost, are easily used, and are highly acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a perspective view of one form of combined sun shade and article carrier of the present invention, shown closed for use as a bag or valise;

Figure 2 is a perspective view showing the device in opened position;

Figure 3 is an enlarged fragmentary vertical section taken substantially on the plane of line 3—3 of Figure 2;

Figure 4 is a perspective view showing the device arranged as a sun shade;

Figure 5 is a perspective view of another form of the invention, shown in closed position;

Figure 6 is a perspective view showing the device of Figure 5 in open position;

Figure 7 is a perspective view showing the device arranged as a sun shade; and

Figure 8 is an enlarged fragmentary horizontal section taken substantially on the plane of line 8—8 of Figure 5.

Referring to the drawings in detail, and first to Figures 1 through 4, indicated generally at 10 is a combined sun shade and article carrier comprising a pair of complementary elongated rectangular pan-shaped sections 14 and 16, constructed of any suitable material, such as plastic, heavy canvas, and the like.

The sections 14 and 16 are hinged together at one end and include back panels 18 and 20 and longitudinal side walls 22, 24 and 26, 28, respectively. On the inner ends of the panels 18 and 20 are joined flexible flange portions 30 and 32 providing a bottom 34 for the article carrier, as seen in Figure 1, and acting as a hinge for the sections. The outer ends of the panels 18 and 20 are devoid of flange portions, as seen in Figure 1, and this provides an open upper end 36 for the carrier through which articles can be inserted. Loop handles 38 and 40 are secured to and rise above the outer or upper edges 42 and 44 of the sections 14 and 16, respectively.

On the free edges of the side walls of the sections 14 and 16 are cooperating zipper or slide fastener elements 48 and 50, securable together by a runner 51 to hold the sections in closed relation.

Indicated generally at 54 and 56 are U-shaped leg assemblies having bight portions 58 and 60, respectively, journaled in transverse sleeves 62 and 64, respectively, secured on the inner surfaces of the respective panels 18 and 20 near their outer ends, by means of stitching, for example. Releasable retaining straps 66 are secured on the panels 18 and 20 near their inner ends and are engaged over the legs 53 of the leg assemblies 54 and 56, for retaining the legs 53 against the inner surfaces of the panels 18 and 20 when the leg assemblies are not in use. As clearly shown in Figure 4, the leg assemblies 54 and 56 can be disposed in depending normal relation to the panels 18 and 20, with the sections hinged into coplanar, end to end relation, to serve as a sun shade, with the legs 53 engaged with a support surface S.

In the form of the invention shown in Figures 5 through 8, the combined sun shade and article carrier 70 simulates a suit case or valise and comprises a pair of complementary pan-shaped sections, indicated generally at 74 and 76. The sections 74 and 76 may be constructed of any suitable material, and may be substantially rigid if desired.

The section 74 includes a back panel 78 having extending therearound a side wall 80. The section 76 incorporates a back panel 82 having extending therearound a side wall 84. The edges 81 and 85 of the side walls 80 and 84 are in abutting relation in the closed condition of the sections, as shown in Figure 5.

Inner end portions 86 and 88 of the side walls of the sections are hingedly connected together at their free edges by a transversely extending elongated hinge assembly, indicated generally at 90 in Figure 8.

Extending along and reaching from the free edges of the side walls of the sections are cooperating slide fastener elements 94 and 96, with which cooperates a runner or slide 92.

Transverse sleeves 98 and 100 are secured on the inner surfaces of the panels 78 and 82, respectively, at their outer ends, which journal the bight portions of U-shaped leg assemblies, indicated generally at 102 and 104, similar to leg assemblies 54 and 56 of Figures 1 to 4. The legs 101 of the leg assemblies 102 and 104 are retained adjacent the inner surfaces of the panels 78 and 82 by means of releasable retaining elements 106.

Secured on and extending laterally from related side portions 103 of the side walls 80 and 84 are loop handles 108 and 110.

When the sections 74 and 76 are disposed in coplanar relationship they define a sun shade, as indicated generally at 112, see Figure 7, with the leg assemblies 102 and 104 disposed substantially normal to the sections 74 and 76 and engaged with a support surface S.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. A combined sun shade and article carrier device comprising a pair of elongated rectangular pan-shaped sections having back panels and side walls thereon comprising longitudinal side wall portions, said panels having outer ends and inner ends, said side walls having free edges, hinge means on and extending between said inner ends of the back panels enabling hinging the sections from closed registered positions to coplanar end to end open positions, said back panels having inner surfaces, transverse sleeves secured on said inner surfaces of the back panels at the outer ends thereof, elongated U-shaped leg assemblies having bight portions journaled in said sleeves and legs located near said longitudinal side wall portions and lying against the inner surfaces of the back panels, said legs having free ends located near the inner ends of the back panels, retaining means releasably engaged with the free ends of the legs and retaining the legs against the inner surfaces of the back panels, said leg assemblies when released by said means being swingable in said sleeves to support the device in open position on a support surface to serve as a sun shade, and securing means for releasably securing the sections together in their closed positions.

2. A device according to claim 1, wherein said hinge means comprises connected flexible flanges on the inner ends of the back panels of the sections, which together serve as a bottom for the device while the sections are in closed positions.

3. A device according to claim 1, wherein said hinge means comprises connected flexible flanges on the inner ends of the back panels of the sections, which together serve as a bottom for the device while the sections are in closed positions, and the outer ends of the back panels are devoid of side wall portions so as to define an open upper end for the device, and handles secured on the outer ends of the back panels.

4. A device according to claim 1, wherein said side walls extend entirely around the back panels and include longitudinal portions and inner end portions, and said hinge means comprises an elongated hinge assembly secured on the free edges of said inner end side wall portions.

5. A device according to claim 1, wherein said side walls extend entirely around the back panels and include longitudinal portions and inner end portions, and said hinge means comprises an elongated hinge assembly secured on the free edges of said inner end side wall portions, longitudinal side wall portions at one side of the sections together constituting a bottom for the device while the sections are in closed positions, and handles secured on the other longitudinal side wall portions.

References Cited in the file of this patent

UNITED STATES PATENTS

| | | |
|---|---|---|
| 134,149 | King | Dec. 24, 1872 |
| 1,453,946 | Pine et al. | May 1, 1923 |
| 2,315,126 | Michalke | Mar. 30, 1943 |
| 2,326,461 | Howe | Aug. 10, 1943 |
| 2,554,688 | Vollweiler | May 29, 1951 |
| 2,693,258 | Fleisch | Nov. 2, 1954 |